(12) United States Patent
Barr

(10) Patent No.: US 6,454,454 B1
(45) Date of Patent: Sep. 24, 2002

(54) POLYMER MELTING AND EXTRUDING APPARATUS WITH LINEAR DOWNSTREAM THREADS

(76) Inventor: Robert A. Barr, P.O. Box 4476, Virginia Beach, VA (US) 22434

( * ) Notice: Subject to any disclaimer, the term of this patent is extended or adjusted under 35 U.S.C. 154(b) by 0 days.

(21) Appl. No.: 09/614,180

(22) Filed: Jul. 11, 2000

Related U.S. Application Data

(63) Continuation-in-part of application No. 09/007,795, filed on Jan. 15, 1998, now abandoned, which is a continuation-in-part of application No. 08/640,996, filed on Apr. 30, 1996, now abandoned.

(51) Int. Cl.[7] .............................. B29B 7/42; B29B 7/58
(52) U.S. Cl. ............................ 366/78; 366/80; 366/88; 366/89; 366/90
(58) Field of Search .................. 366/78–81, 88–90, 366/318, 319, 323, 324; 198/661–664, 676; 425/208, 209

(56) References Cited

U.S. PATENT DOCUMENTS

| | | | |
|---|---|---|---|
| 3,035,304 A | 5/1962 | Reifenhäuser |
| 3,175,248 A | 3/1965 | Swenson |
| 3,239,883 A | 3/1966 | Ferrari |
| 3,371,379 A | 3/1968 | Reifenhauser |
| 3,503,944 A | 3/1970 | Wisseroth |
| 3,583,684 A | 6/1971 | Schippers |
| 3,689,182 A | 9/1972 | Kovacs |
| 3,712,594 A | 1/1973 | Schippers et al. |
| 3,924,842 A | 12/1975 | Klein et al. |
| 3,999,921 A | 12/1976 | Thor et al. |
| 4,029,459 A | 6/1977 | Schmiedeke |
| 4,070,138 A | 1/1978 | Stanwood |
| 4,129,386 A | 12/1978 | Rauwendaal |
| 4,164,385 A | 8/1979 | Finkensiep |
| 4,218,146 A | 8/1980 | Ingen Housz |
| 4,290,702 A | 9/1981 | Klein et al. |
| 4,332,482 A | 6/1982 | Engler |
| 4,387,997 A | 6/1983 | Klein et al. |
| 4,409,164 A | 10/1983 | Brasz et al. |
| 4,453,905 A | 6/1984 | Bennett |
| 4,472,059 A | 9/1984 | Klein et al. |
| 4,637,790 A | 1/1987 | Klein |

(List continued on next page.)

FOREIGN PATENT DOCUMENTS

| | | | |
|---|---|---|---|
| EP | 0806282 | | 3/1999 |
| GB | 1421298 | | 1/1976 |
| SU | 1418059 | * | 2/1987 |
| SU | 1763207 | | 9/1992 |

OTHER PUBLICATIONS

US 5,877,792, 03/1999, Dickmeiss et al. (withdrawn)

*Primary Examiner*—Charles E. Cooley
(74) *Attorney, Agent, or Firm*—Jacobson Holman, PLLC

(57) ABSTRACT

An extruder screw mechanism has a barrel that is heated by heating coils, an internal screw, and a cylindrical melt sleeve having a plurality of circumferentially spaced, axially extending, radial slots there through located between the external barrel and the internal screw. Another embodiment of the extruder has a barrel and an internal screw, with the internal screw having either a single central axial bore or a plurality of internal axial bores. The internal screw is provided with a plurality of external threads, with the threads each having a curved starting portion with a helix angle that has a finite value and gradually increases along an initial portion of the screw until the threads are substantially linear and parallel to the axis of the screw along the melting portion of the screw; a related embodiment has threadless portion separating the linear threads from the curved upstream threads. Circumferentially spaced, axially extending, radial slots extend from the outer surface of the screw along the melt section portion of the screw radially inwardly to an associated axial bore for removing melted polymer as it forms between solid polymer and a heated surface.

11 Claims, 11 Drawing Sheets

U.S. PATENT DOCUMENTS

| | | |
|---|---|---|
| 4,746,478 A | 5/1988 | Fujisaki et al. |
| 4,779,989 A | 10/1988 | Barr |
| 4,802,140 A | 1/1989 | Dowling |
| 4,859,068 A | 8/1989 | Sironi |
| 4,896,969 A | 1/1990 | Dray |
| 4,901,635 A | 2/1990 | Williams |
| 5,056,925 A * | 10/1991 | Klein |
| 5,098,267 A | 3/1992 | Cheng |
| 5,232,714 A * | 8/1993 | Kohno et al. |

* cited by examiner

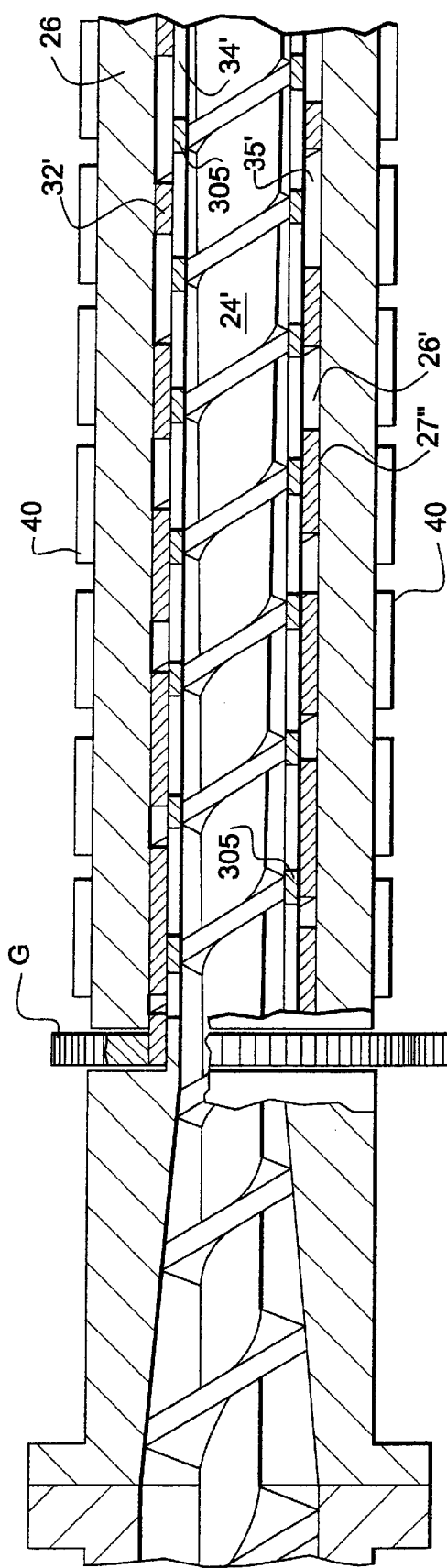
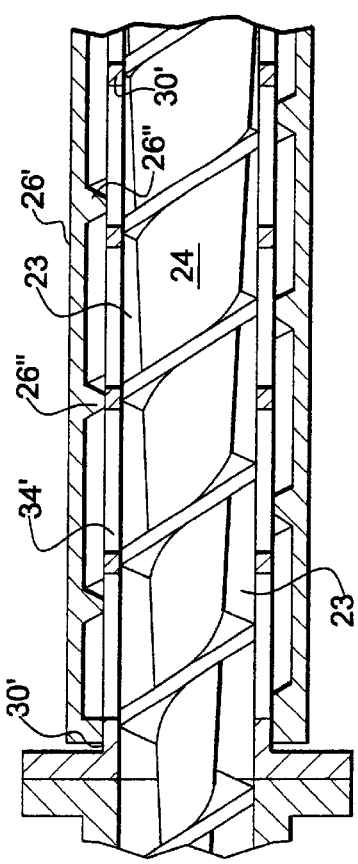
FIG. 5
FIG. 6

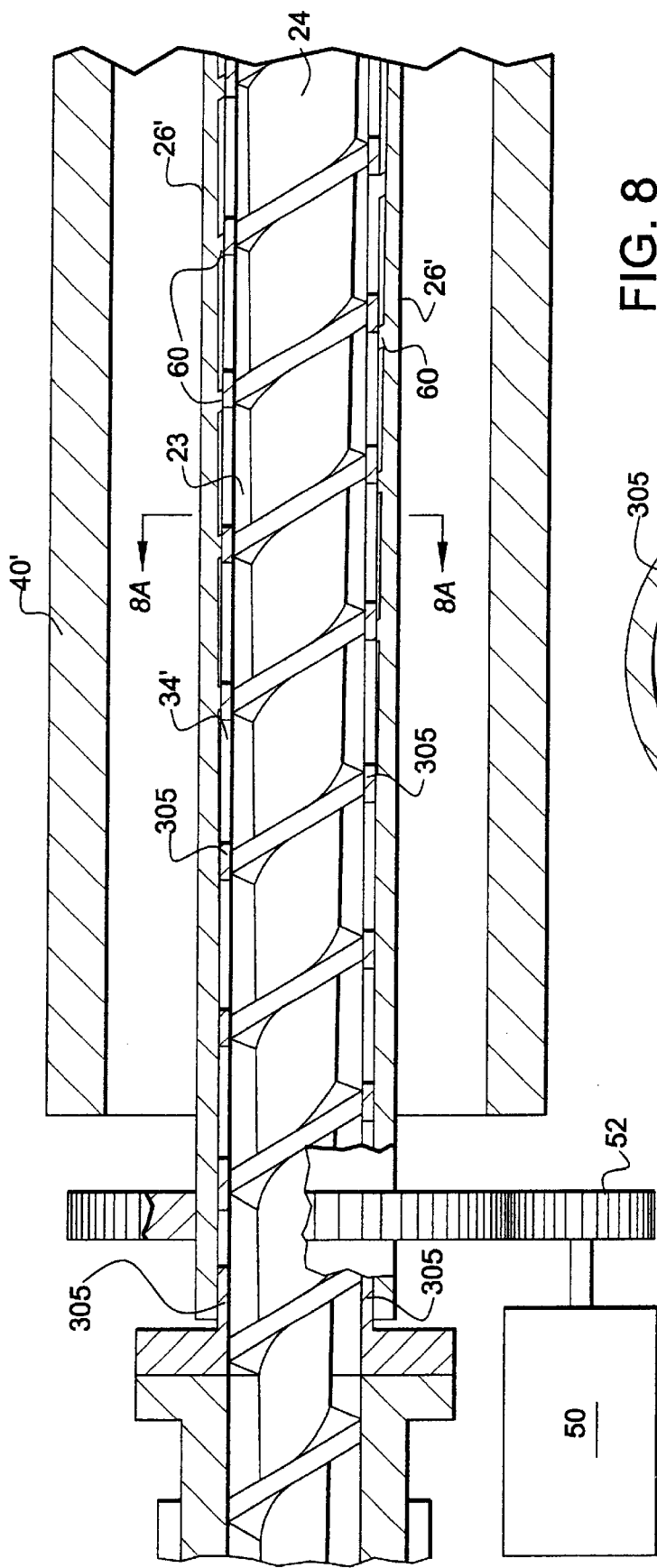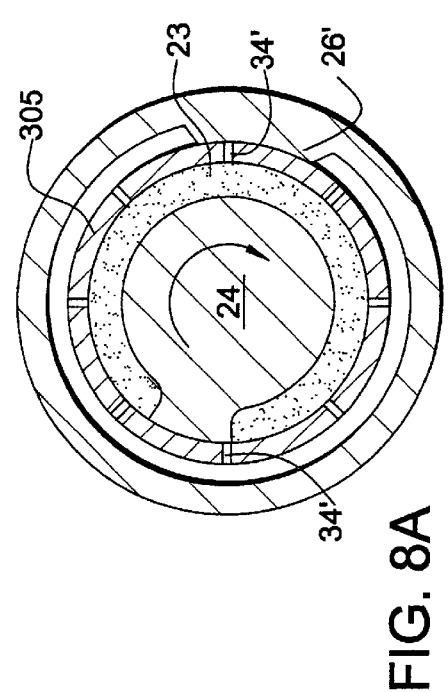
FIG. 8
FIG. 8A

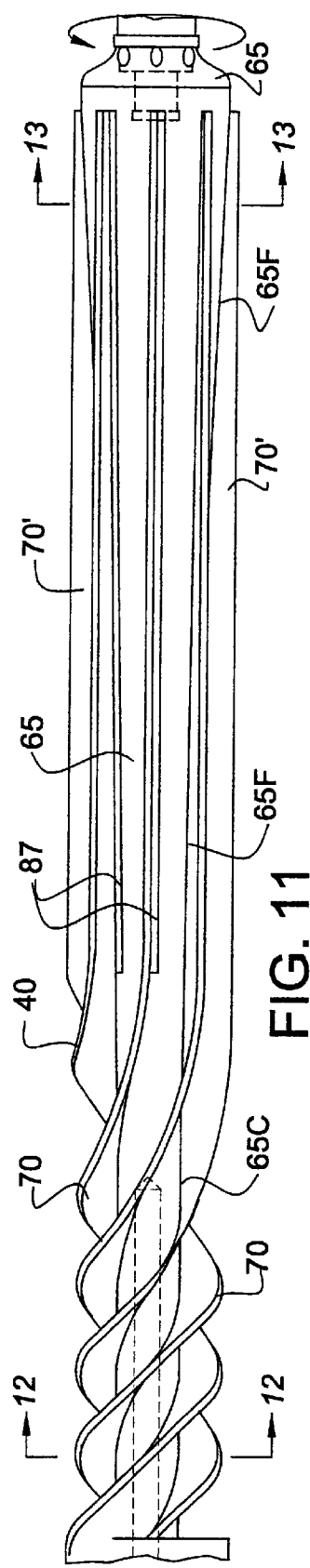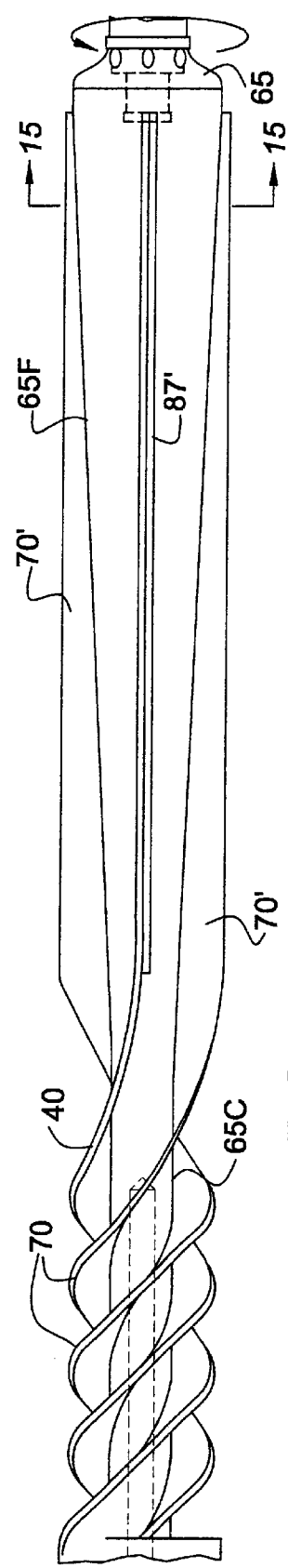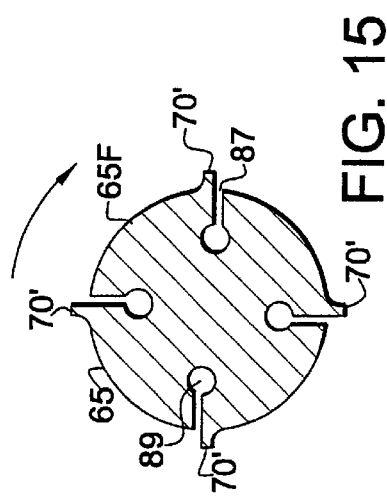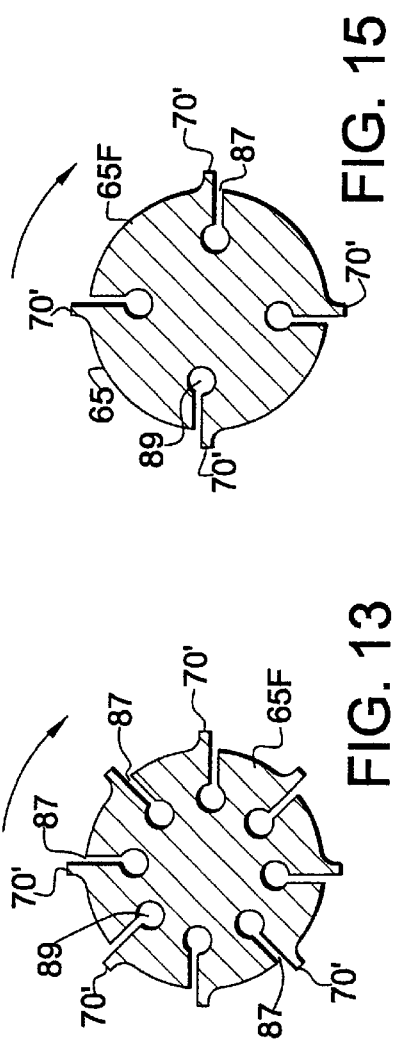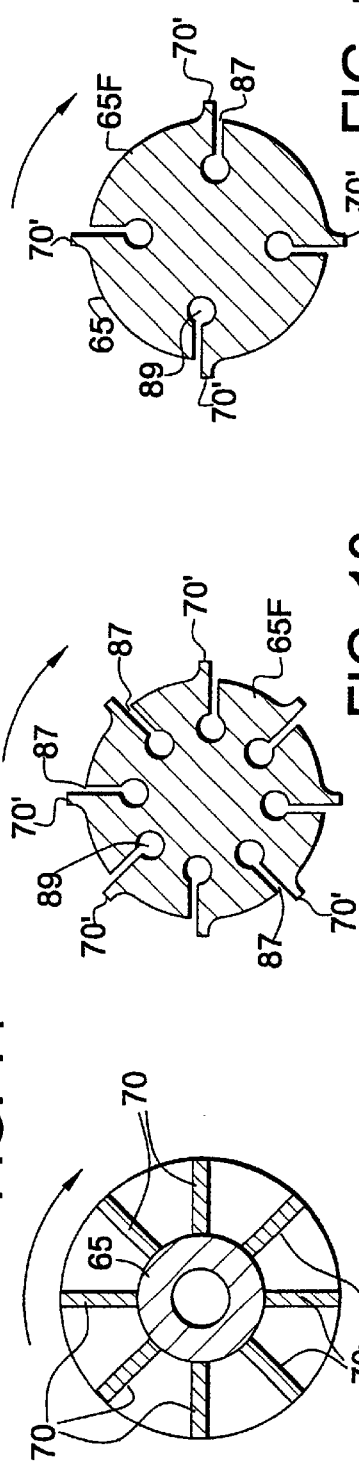

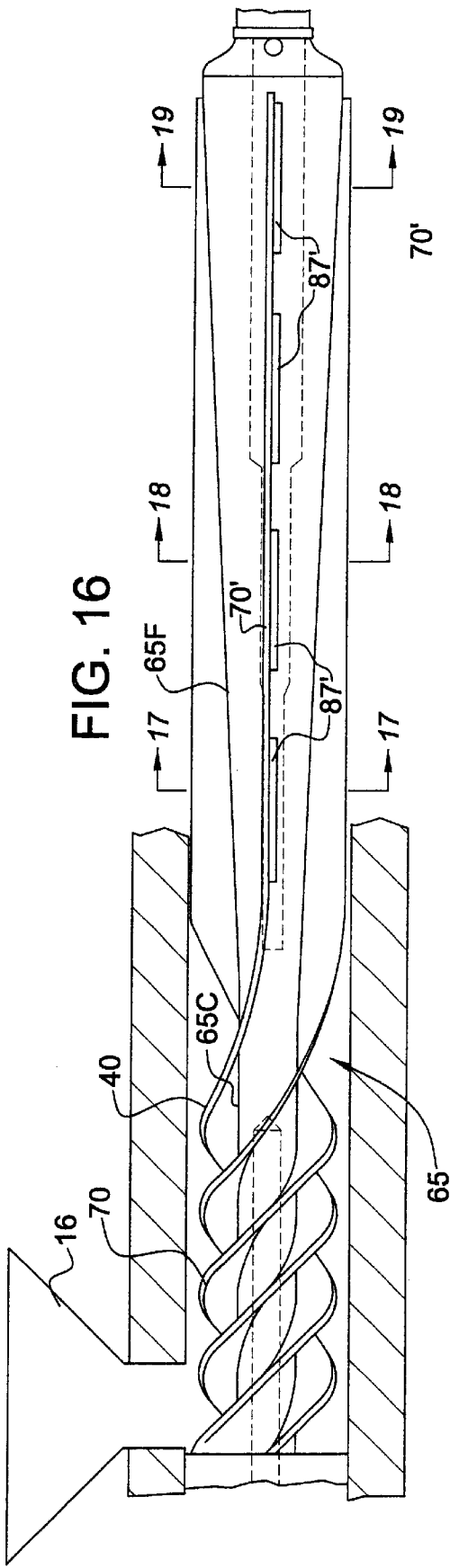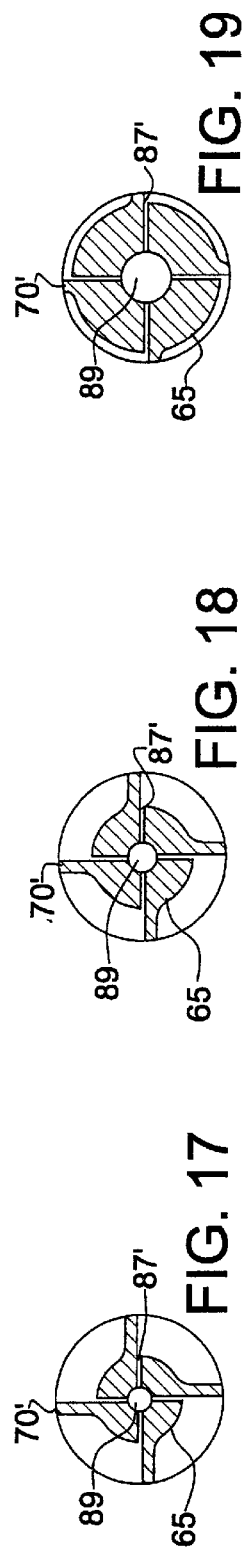

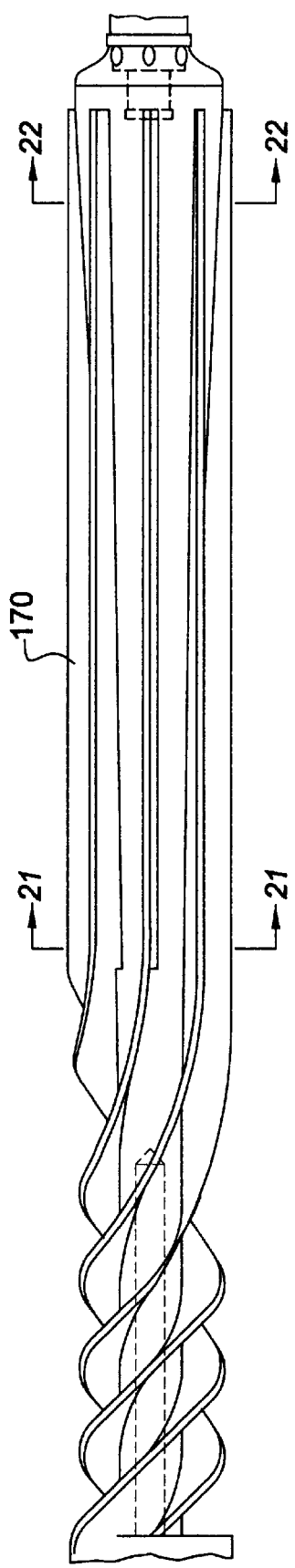
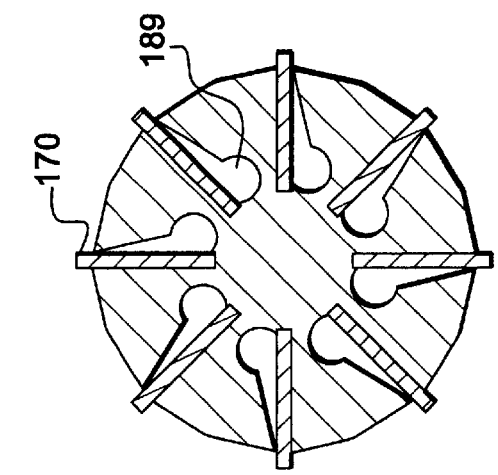
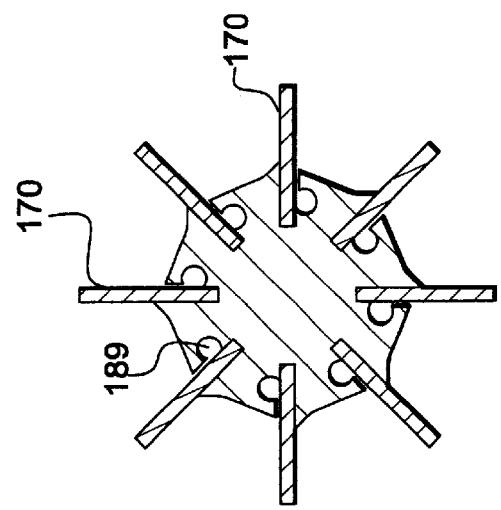
FIG. 20
FIG. 21
FIG. 22

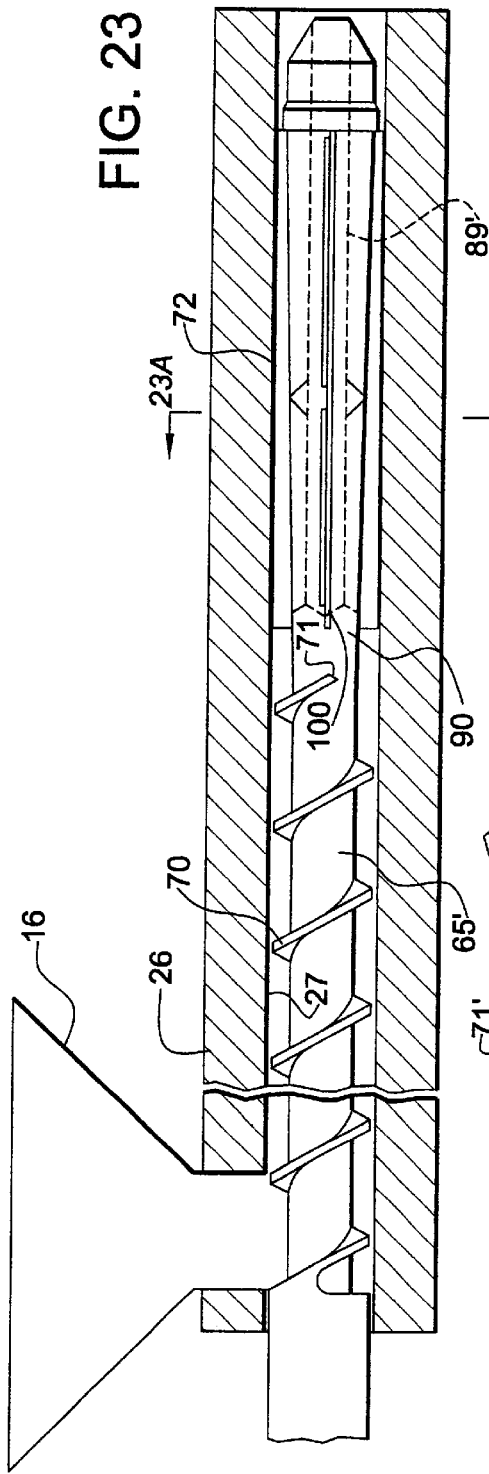
FIG. 23
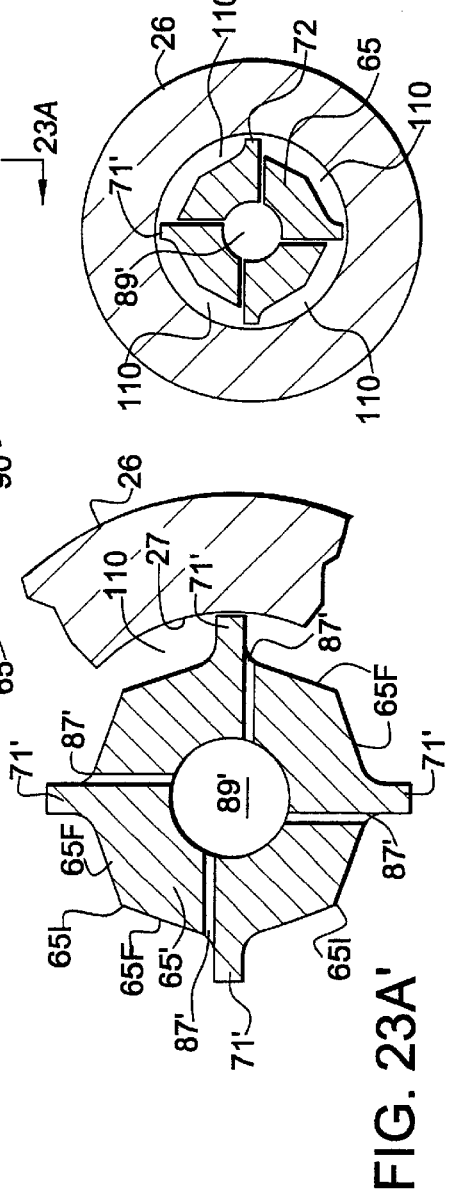
FIG. 23A
FIG. 23A'
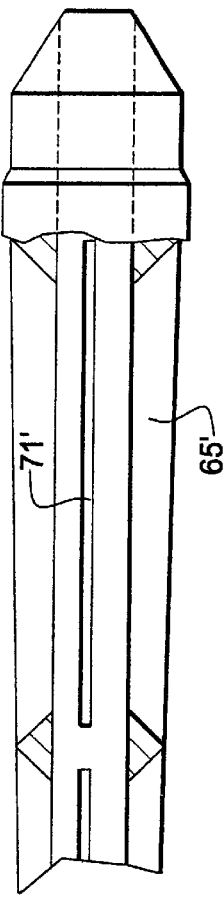
FIG. 23B

POLYMER MELTING AND EXTRUDING APPARATUS WITH LINEAR DOWNSTREAM THREADS

CROSS REFERENCE TO RELATED APPLICATION

This Application is a Continuation-In-Part of earlier application Ser. No. 09/007,795, filed Jan. 15, 1998 (now abandoned), which is a Continuation-In-Part of Ser. No. 08/640,996 filed Apr. 30, 1996 (now abandoned).

BACKGROUND OF THE INVENTION

1. Field of the Invention

The present invention relates to a screw type extruder for melting solid polymer materials. More specifically, the invention relates to a screw extruder that transforms solid polymer materials to a melted fluid material by contact of the solid polymer materials with a heated surface. The heated surface is provided with a plurality of circumferentially-spaced, axially extending, radial slots such that the fluid material passes outwardly or inwardly through the radial slots and is removed from the heated surface to ensure that the heated surface remains in close contact with the unmelted solid polymer material at all times for improved heat transfer.

2. Related Art

Devices for converting solid thermoplastic materials to a melted condition are well known in the art. Known devices for use in manufacturing plastic products utilize, in one form or another, an extrusion device to melt, mix, and pump molten polymer for further processing. A commonly used extruder is known as a single screw extruder. A typical extruder mechanism of the single screw extruder type utilizes a heated barrel, a helical auger or plasticating screw within the barrel and a feed throat. The screw is rotated by conventional means. The melting of the plastic is accomplished by heat conduction and shear energy dissipation at the inside wall of the barrel. The shear energy is generated as a result of relative motion between the packed solid polymer particles in the screw channel (solid bed) and the heated stationary barrel surface. As the solid polymer particles are melted, a layer of melt is formed on the barrel's inner circumferential surface, which is continuously wiped off by the screw thread or flight. Barrier type screws are also known for use in the single screw extruder wherein the external thread of the screw includes a rear side portion of full thread radius and a leading side portion of smaller radius, between which a groove is formed. The barrier screw can provide an improved means for separating the melt from the solid bed in order to increase the efficiency and quality of the melt.

In U.S. Pat. No. 3,689,182 to Kovacs, a screw extruder is shown wherein the polymer melt is bled radially inwardly into a central axial bore containing a second coaxial screw. In Kovacs, radial holes 14 of ⅛ inch diameter are distributed along the leading face of the thread of the external screw at uniform angular spacings to dispose six or eight radial openings per turn of the thread. In Kovacs, the assumption is made that the polymer melt forms in a small pool along the leading side of the thread on the external screw. Hence, Kovacs states that satisfactory removal of the melt is obtained with openings of ⅛ inch in diameter distributed serially along the leading face of the thread. In the embodiment shown in Kovacs employing a barrier type screw having a rearward portion of full thread radius and a leading side portion of a smaller radius of thread, Kovacs assumes that a spiral solid thermoplastic body will develop along the full length and volume of the channel defined by the thread. Melted material is only removed from the channel by radial holes positioned serially along the groove defined between the rearward and leading side portions of the thread. Thus, a continuous layer of melted polymer is allowed to form along the entire circumferential extent of the spiral channel defined by the thread, with the melt only being bled off at the leading edge of the thread.

The second embodiment of the Kovacs patent shown in FIGS. 4, 5, 6 and 7 employs a screw 30 having a thread 31 which terminates at its downstream end at a location upstream of, and spaced from, a head 33 as shown in FIG. 5 of the patent. Head 33 has a smooth perimetric area machined to form a desired clearance with the inner surface extruder barrel to restrain the passage of material through said clearance except for that necessary to prevent fouling as discussed in the paragraph beginning in Column 5, Line 55 of Kovacs. The head 33 has grooves 57 which are closed at their front ends and open only at their rear ends with the purpose of the grooves being to trap solid particles. Head 33 also has additional grooves 58 which are closed at both their front and rear ends and which collect melted material from grooves 57. Thus, the second embodiment of Kovacs does not disclose linear threads extending from or adjacent the downstream end of the thread 31 nor is such structure shown elsewhere in the Kovacs patent.

Cheng U.S. Pat. No. 5,098,267 discloses an elongated rotatable screw plunger 12 positioned for rotation and reciprocation in a barrel 10 with the screw plunger 12 extending through an upstream metering section 28 and a mixing section 40 immediately downstream of metering section 28. The screw 12 includes a bore 50 solely located in its downstream end in mixing section 40 as shown in FIG. 5. Lands 38 are provided in metering section 28 and are separated by metering section grooves 36 and a gap space is provided between the downstream end of the spiral thread of the screw and the upstream ends of lands 38.

The mixing structure immediately downstream of the lands 38 consists of mixing section grooves 42 provided between a "land" 44 which would better be described as a barrier plate or flight which has a reduced height relative to the general surface of plunger 12 and a "land" 46 which could better be described as a wiper plate since it is adjacent the inner surface of the barrel 12. Rotation of the plunger 12 causes plasticate to flow across "land" 44 and then downwardly into slot 48 because of the shape and dimension of land 46 as discussed in the paragraph beginning in column 4, line 26 of the Cheng patent.

Soviet Union publication SU 1763207 discloses a screw having spiral threads and an internal bore but not having linear threads spaced from the spiral threads or being closely spaced from the inner surface of the barrel in which the screw is mounted.

In prior art screw-type extruders, such as Kovacs and others, the thickness of the melt film formed along the inside of the heated barrel directly affects the efficiency and rate of melting since the heat developed by dissipation of shear energy between the solid polymer and the barrel is reduced. This reduction in melting rate is especially important on large extruders wherein the circumferential length of the solid bed is very large.

SUMMARY OF THE INVENTION

The present invention provides a device for transforming solid thermoplastic materials into fluid material by contact with a surface, wherein melting of the thermoplastic material is caused by heat conduction and shear energy dissipation. The shear energy is created by relative motion between the solid polymer material and a surface, and the surface is provided with a plurality of circumferentially spaced, axially extending, radial slots there through such that melted polymer material can pass through the surface into an area for storage or removal. The provision of circumferentially spaced, axially extending, radial slots allows the surface to remain in close contact with the solid material at all times by providing means for draining off melted polymer at several locations around the circumference. Hence, the layer of melt interfaced between the solid polymer material and the surface is kept very thin, thus improving heat transfer and shear energy dissipation.

In one embodiment, the present invention is provided with an external barrel that is heated by heating coils, an internal screw, and a floating cylindrical sleeve having a plurality of circumferentially spaced, axially extending, radial slots there through located between the external barrel and the internal screw. The internal screw comprises a central core and an external thread so interrelated in cooperation with the floating cylindrical sleeve as to define a continuous spiral channel between the screw core and the floating cylindrical sleeve. The portion of the spiral channel located radially inwardly from the heating coils constitutes a melt section that includes a substantial portion of the length of the channel and that terminates adjacent the front or material discharging end of the screw. The thread and the core of the screw can be shaped through the melt section proceeding in the direction of material advancement to progressively decrease the depth of the spiral channel without substantial change in its width. As a result there is a corresponding progressive decrease in the cross sectional area of solid polymer material contained in the spiral channel is it advances toward the discharge end of the screw. The coaxial sleeve fits between the external barrel and the internal screw. The coaxial sleeve has helical flights or threads cut into its outer circumferential surface, and circumferentially spaced axially extending radial slots cut through to the inside circumferential surface of the coaxial sleeve.

The floating cylindrical sleeve is coaxial with the inner screw and the external barrel. The sleeve is constrained from axial movement, but is free to rotate. The speed of rotation of the sleeve is a function of the radial clearances between the sleeve and the inner screw and between the sleeve and the external barrel. The shear stress generated by the solid polymer material and melted material contacting the inner circumferential surface of the floating sleeve causes the sleeve to rotate in the same direction as the inner screw. Shear stress is also developed in the melted polymer that has passed through the floating sleeve at the interface between the melted polymer and the external barrel. This shear stress retards rotation of the floating sleeve to a speed less than that of the inner screw. The difference in rotational velocity between the inner screw and the coaxial sleeve generates the shear stress and resultant heat energy that helps to melt the polymer at the outer diameter of the internal screw. The axially extending, radial slots through the cylindrical floating sleeve are spaced around the circumference of the sleeve such that the circumferential distance between the slots is considerably less than the circumferential distance of melt film formed on conventional or even barrier type extruder screws.

In one embodiment of the present invention, the external barrel is provided with internal threads that serve to wipe the melt film off the external circumferential surface of the cylindrical floating sleeve and move the melt to the discharge end of the extruder screw. Alternatively, the cylindrical floating sleeve is provided with external threads and the barrel is provided with a smooth internal surface. A further embodiment comprises a cylindrical floating sleeve with a smooth external surface, a surrounding barrel with a smooth internal surface and a separate spiral member located between the floating sleeve and the barrel defining a channel along which the melted polymer is moved toward the discharge end of the extruder. Additional embodiments can include means for rotating either the barrel, the cylindrical floating sleeve, and/or the separate spiral member in order to provide the advantage of more complete control over the relative rotational velocities of the parts of the extruder screw for optimum performance.

A further embodiment of the present invention comprises an external barrel and a coaxial internal screw having external threads that fit closely to the inner circumferential surface of the barrel, wherein the internal screw is provided with an internal axial bore for the removal of the melted polymer material. The internal screw is also provided with multiple external threads such that a plurality of continuous spiral channels are formed along the external surface of the screw to move the solid polymer materials along the screw. In this embodiment, the screw flights or threads extend axially substantially parallel to the screw axis over a substantial length of the melt section in the extruder screw. Axially extending radial slots through the screw are provided at the leading edge of the axial screw flights or threads, providing passageways into the center axial bore through the screw.

The circumferential spacing of the radial slots through the internal screw is determined by the number of axial threads provided on the screw. The pressure created by the flow of melted polymer into the center axial bore of the screw forces the melt along the axial extent of the bore until it exits from the discharge end of the extruder screw. The force to keep the solid polymer material moving along the axial threads in the melt section of the extruder screw is provided by the beginnings of the threads in the feed section which are provided with a helix angle.

In a further embodiment of the present invention, the internal screw can be provided with a plurality of internal axial bores providing multiple passageways for movement of the polymer melt to the discharge end of the extruder screw. These multiple internal axial bores are arranged in a circular pattern a short distance below the surface of the screw such that the depth of the radial slots passing from the screw channel to an associated internal axial bore is kept short. The number of screw threads provided along the internal screw equals the number of internal axial bores for moving polymer melt to the discharge end of the extruder screw. The radial slots pass from the leading edge of each screw thread radially inwardly to an associated internal axial bore.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 5 is a side elevation view in partial cross-section of a third embodiment of the present invention having rotating flights or threads and a rotating internal screw with a stationary melting sleeve and a stationary external barrel;

FIG. 6 is a side elevation view in partial cross-section of a fourth embodiment of the present invention having a rotating internal screw and a rotating threaded barrel and a stationary cylindrical melting sleeve;

FIG. 8 is a side elevation view in partial cross-section of the sixth embodiment of the present invention which has a rotating internal screw, a rotating threaded barrel, and a stationary slotted melting sleeve;

FIG. 8A is a cross-sectional view taken in the direction of arrows 8A—8A in FIG. 8;

FIG. 11 is a side elevation view of an internal screw used in a sixth embodiment of the present invention which has eight circumferentially-spaced, axially extending threads along the melt section of the screw, with eight radial slots extending from the leading edge of each of the threads into one of eight internal axial bores provided through the screw;

FIG. 12 is a cross-sectional view taken in the direction of arrows 12—12 in FIG. 11;

FIG. 13 is a cross-sectional view taken in the direction of arrows 13—13 in FIG. 11;

FIG. 14 is a side elevation view of an internal screw used in a seventh embodiment of the present invention and having four axially extending threads extending along a melt section of the screw with radial slots extending from the leading edge of each the four threads into one of four internal axially parallel bores extending through the screw;

FIG. 15 is a cross-sectional view taken in the direction of arrows 15—15 in FIG. 14;

FIG. 16 is a side elevation view of an internal screw and its associated barrel shown in section used in an eighth embodiment of the present invention having four axially extending threads provided along the melt section of the screw with spaced, axially extending, radial slots passing from the leading edge of each of said threads into a single central axial bore;

FIG. 17 is a cross-sectional view taken in the direction of arrows 17—17 in FIG. 16;

FIG. 18 is a cross-sectional view taken in the direction of arrows 18—18 in FIG. 16;

FIG. 19 is a cross-sectional view taken in the direction of arrows 19—19 in FIG. 16;

FIG. 20 is a side elevation view of an internal screw used in a ninth embodiment of the present invention having eight axially extending threads along the melt section of the screw wherein each of the threads is formed by a separate insert that is inserted into a tapered radial slot extending into one of eight internal axial bores;

FIG. 21 is a cross-sectional view taken in the direction of arrows 21—21 in FIG. 20;

FIG. 22 is a cross-sectional view taken in the direction of arrows 22—22 in FIG. 20;

FIG. 23 is a side elevation of a tenth embodiment which is similar to the embodiment of FIG. 16 but differs therefrom in that the screw has spiral upstream spiral threads which terminate upstream of the upstream ends of the radial threads so as to provide a threadless space immediately upstream of the radial threads;

FIG. 23A is a sectional view take along lines 23A—23A of FIG. 23 in which only a portion of the barrel is illustrated for the sake of clarity;

FIG. 23A' is an enlargement of a portion of FIG. 23A;

FIG. 23B is a partial axial sectional view of the screw of FIG. 23 illustrating the internal construction of the screw;

DETAILED DESCRIPTION OF THE PREFERRED EMBODIMENTS

Figure 1:
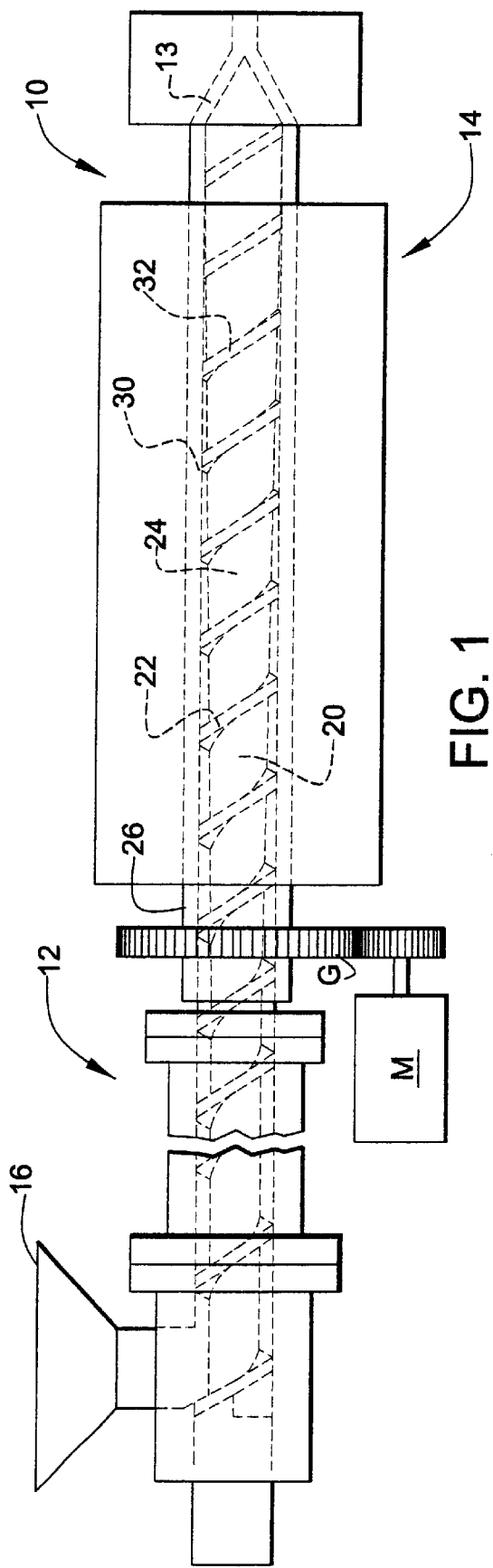
FIG. 1 is a side elevation view of a first embodiment of the present invention having a driven outer rotating barrel and a stationary melting sleeve, showing the hopper for feeding solid polymer material into the main internal screw.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring initially to FIG. 1 of the drawings, the first embodiment of the present invention is shown. This embodiment includes an extruder screw assembly 10, an infeed section 12 and a melt section 14. A hopper 16 is provided in the infeed section 12 for directing solid polymer material in pellet or the like form to a central screw 20 having a spiral thread 22 of uniform pitch and a tapered core 24 which increases in diameter in the direction from the feed section 12 to the melt section 14. The spiral thread 22 is formed with a uniform outer radius for mating operation within a floating cylindrical melting sleeve 30 that is, in turn, surrounded by an outer barrel 26. Cylindrical melting sleeve 30 can be provided with external outwardly extending threads, or alternatively, barrel 26 can be provided with internal inwardly extending threads. The resulting annular gap between the outer circumferential surface 29 of floating cylindrical sleeve 30 and the inner circumferential surface 27 of barrel 26 constitutes a spiral feed channel 23 along which melted polymer passes and finally exits from the extruder screw through passageways 13 (FIG. 1).

Figure 2:
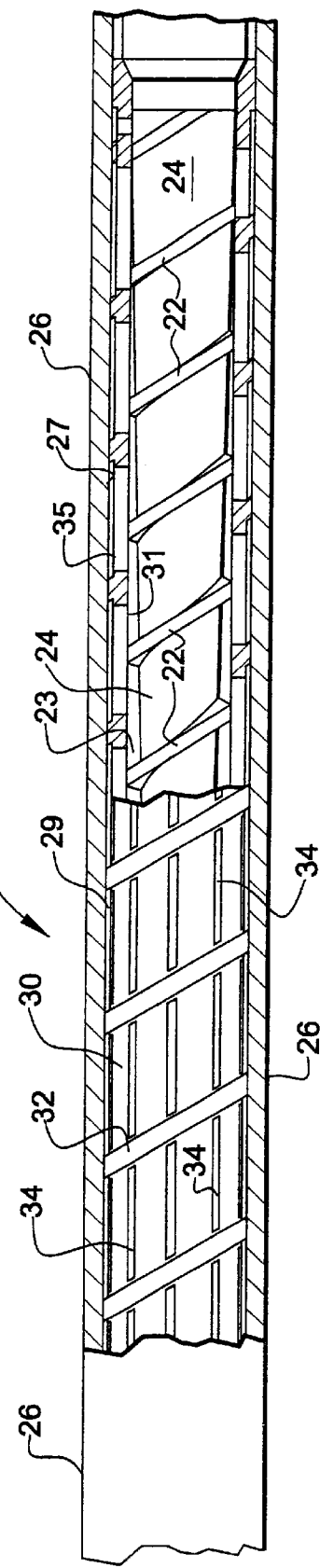
FIG. 2 is a side elevation view in partial cross-section and broken away to show the main internal screw inside of the stationary melting sleeve of the FIG. 1 embodiment.
Figure 3:
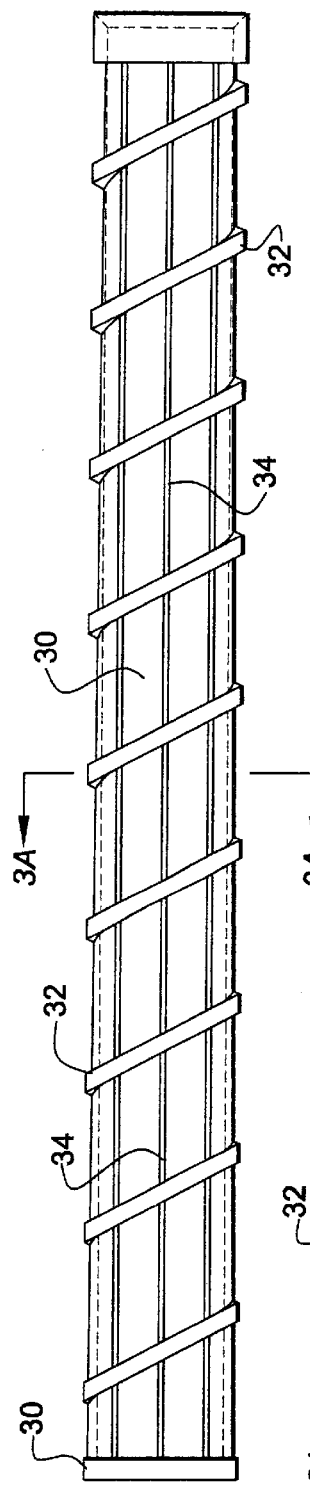
FIG. 3 is a side elevation view of a cylindrical melting sleeve according to the first embodiment of the present invention.
Figure 3A:
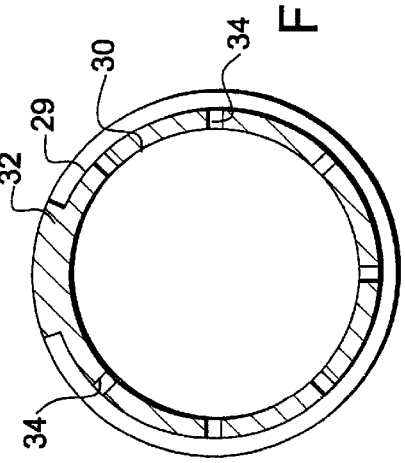
FIG. 3A is a cross-sectional view taken in the direction of arrows 3A—3A in FIG. 3.

Referring to FIG. 2, the melt section of an embodiment of the present invention is shown wherein cylindrical melting sleeve 30 is provided with an external thread 32 and a plurality of circumferentially spaced, axially extending, radial slots 34 that pass through the cylindrical melting sleeve, thus providing communication between the tapered internal main screw core 24 and the spiral feed channel 23 between barrel 26 and floating sleeve 30. Slots 34 have a length/width ratio that is greater than 1.

As the solid polymer material is melted, it forms a melt film along the internal circumferential surface 31 of melting sleeve 30. Because the creation of such a melt film along the surface 31 of melting sleeve 30 reduces the generation of shear energy created by the relative motion between the melting sleeve and the solid polymer materials, it is desired to drain off the melt material at frequent intervals axially and circumferentially along and about feed channel 23. Such drain off is provided by axially extending radial slots 34 passing through floating sleeve 30 at circumferentially and axially spaced intervals such that any melt film formed along the internal circumferential surface of floating sleeve 30 is quickly removed and passes through the floating sleeve to the annular space 35 (FIG. 2) between the floating sleeve and the internal circumferential surface of barrel 26. External threads 32 on floating sleeve 30 then move the melt material along the axial extent of melt section 14 until the melt material is ejected through passageways 13 at the discharge end of the extruder screw 10.

Figure 4:
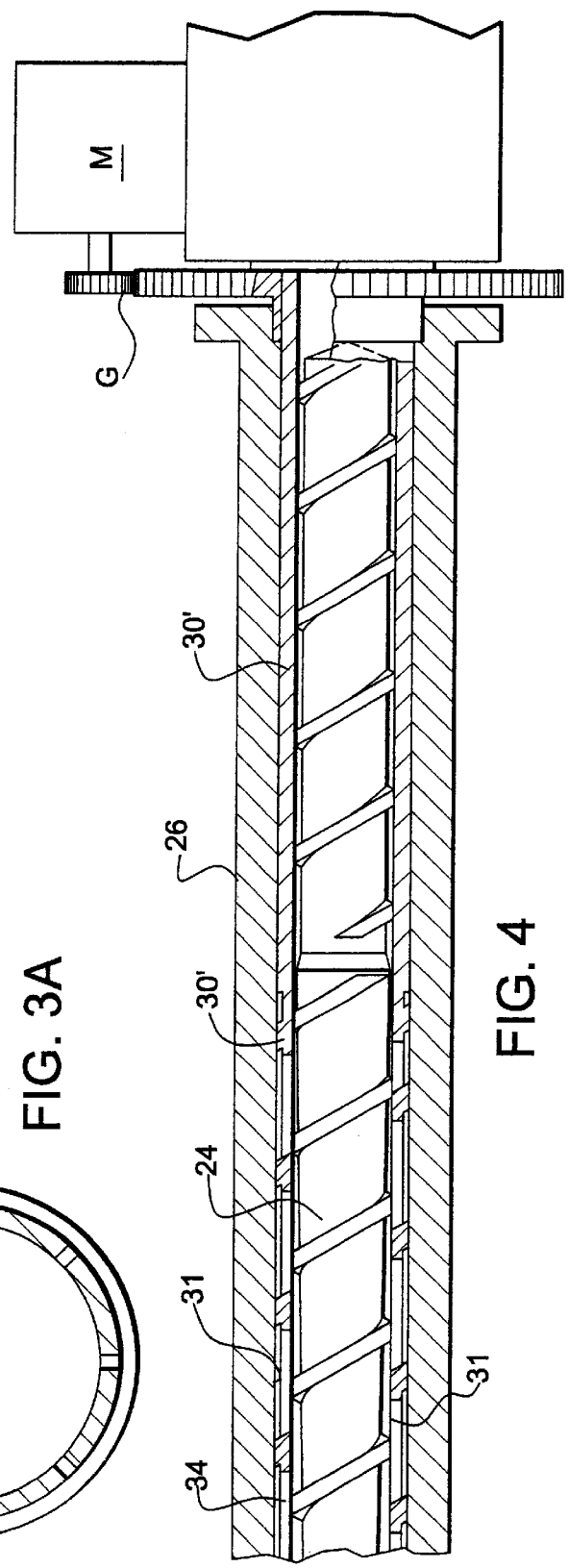
FIG. 4 is a side elevation view in partial cross-section of a second embodiment of the present invention having a rotating melting sleeve, a rotating internal screw and a stationary outer barrel.

The second embodiment which is illustrated in FIG. 4, employs a driven melting sleeve 30' which is identical to floating sleeve 30 except for the fact that driven sleeve 30' is rotated about its axis in fixedly positioned barrel 26 by conventional means, such as a motor M and gear train G as shown. Internal driven screw 24 is also driven to rotate about its axis to provide a continuous flow of solid polymer material in the form of pellets, powder, chips, or the like, from hopper 16 along feed channel 23 formed between the thread 22 of tapered internal screw 24 and the internal circumferential surface 31 of cylindrical melting sleeve 30'. Heating of the solid polymer material passing through feed channel 23 is achieved by heating convential bands not shown in FIG. 4 but provided around the outer circumference of barrel 26 in the manner of bands 40 shown in FIG. 5, and by shear energy dissipation created by the relative motion between the solid polymer in feed channel 23 and the internal circumferential surface 31 of melting sleeve 30'.

Figure 9:
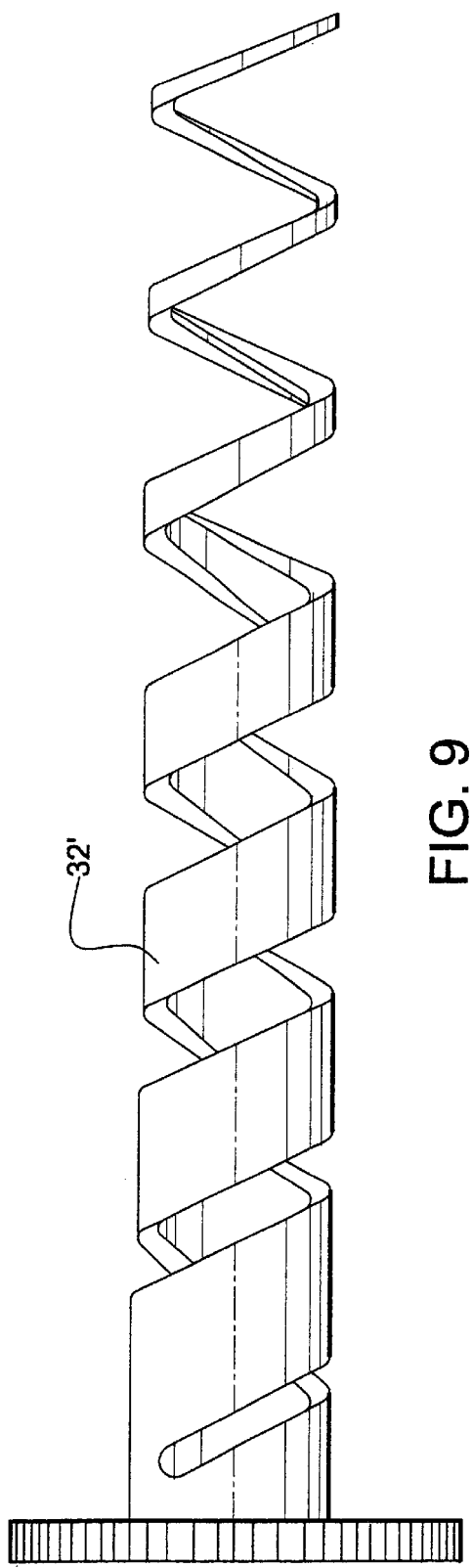
FIG. 9 is a side elevation view of rotatable flights or threads such as used in the third embodiment illustrated in FIG. 5.

Referring to FIG. 5, an alternative third embodiment of the present invention is shown wherein a stationary melt sleeve 30S is provided between tapered internal screw 24 and a driven rotating thread 32' (FIG. 9) that is driven by gear G' of gear train G and has a radially outer surface 27 closely fitted with the internal circumferential surface of barrel 26. Solid polymer material is passed along channel 23 between screw 24' and stationary melt sleeve 30S and the melt polymer passes radially outwardly through axially extending, radial slots 34' of stationary sleeve 30S into the annular gap 35' between stationary melt sleeve 30' and surface 27 of barrel 26. Rotating thread 32' is rotated to drive the melt material along this annular gap and expel it from the discharge end of the extruder screw.

An alternative fourth embodiment is shown in FIG. 6, wherein barrel 26' is provided with internal threads 26" and is rotated by motor means. Melt sleeve 30S is held stationary, and rotary internal screw 24 is rotated by motor means. Radial slots 34' extended through stationary melt sleeve 30' and provide means for draining off stationary melt formed along the inner circumferential surface of stationary melt sleeve 30'. As solid polymer particles pass along the spiral channel 23, melted polymer is prevented from accumulating over a circumferential distance along the inner circumferential surface of melt sleeve 30' any greater than the circumferential distance between radial slots 34'. Thus, the total surface area in contact with solid polymer is increased, and the amount of heat generated by shear energy dissipation is increased, with a resultant increase in the melting rate of the polymer over the melting rate in conventional extruder screws, such as the one shown in Kovacs '182 patent.

Figure 7:
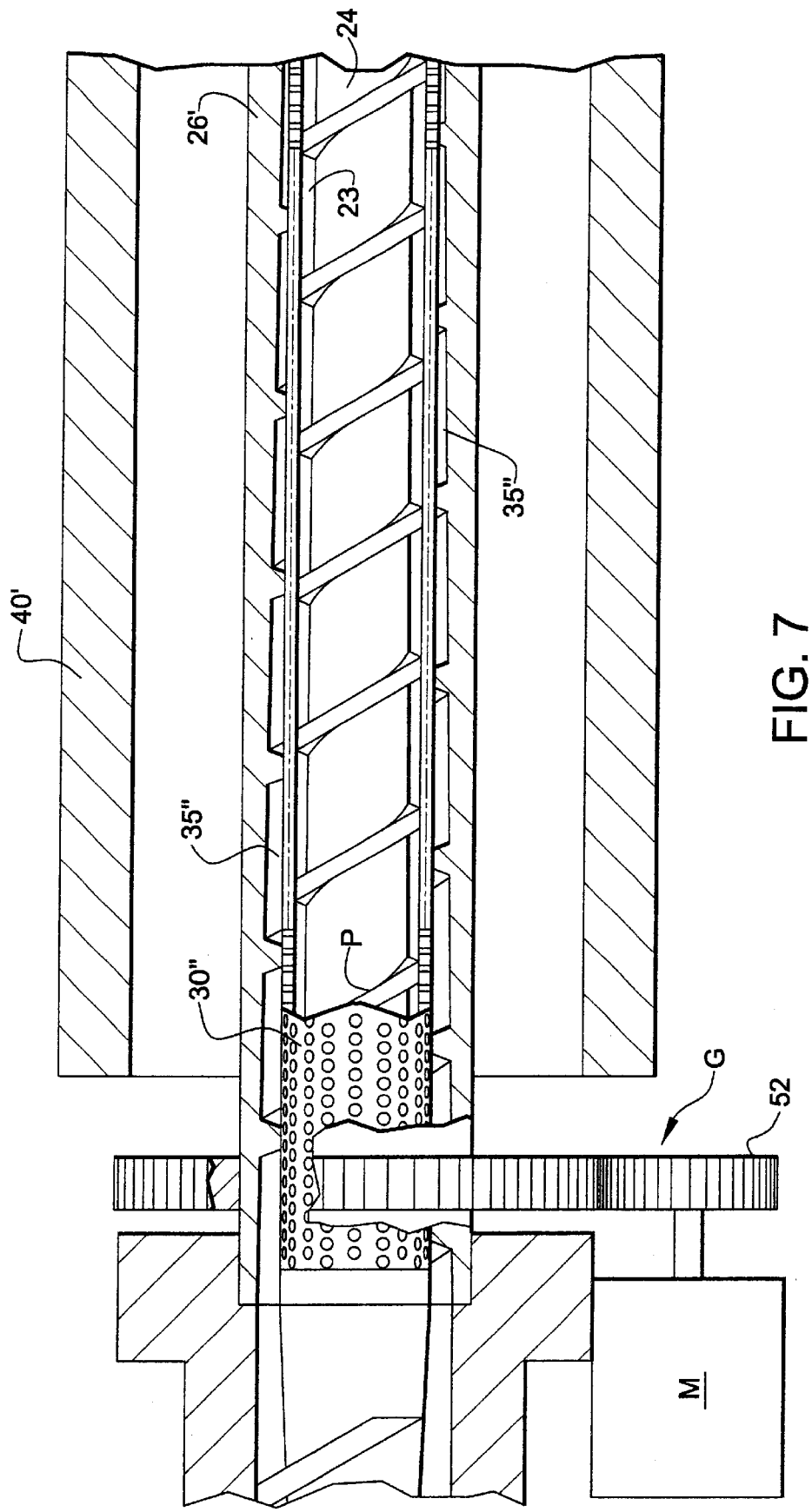
FIG. 7 is a side elevation view in partial cross-section of a fifth embodiment of the present invention similar to the embodiment shown in FIG. 6 and having a rotating internal screw, a rotating threaded barrel, and a stationary porous cylindrical melting sleeve.

A further alternative or fifth embodiment is shown in FIG. 7, wherein fixed melt sleeve 30" is provided with a plurality of radial pores or ports P therethrough for passage of the melt polymer from feed channel 23 of rotary internal screw 24 into the annular gap 35" between melt sleeve 30" and barrel 26' for removal from the extruder mechanism. It should be noted that annular gap 35" progressively decreases in dimension from the infeed (left) end to the outfeed (right) end of the device as shown in FIG. 7. Heating of the polymer material is provided by a heater 40' in addition to the heat resultant from the shear energy generated by relative motion between the solid polymer in channel 23 and the internal circumferential surface of melt sleeve 30".

Figure 10:
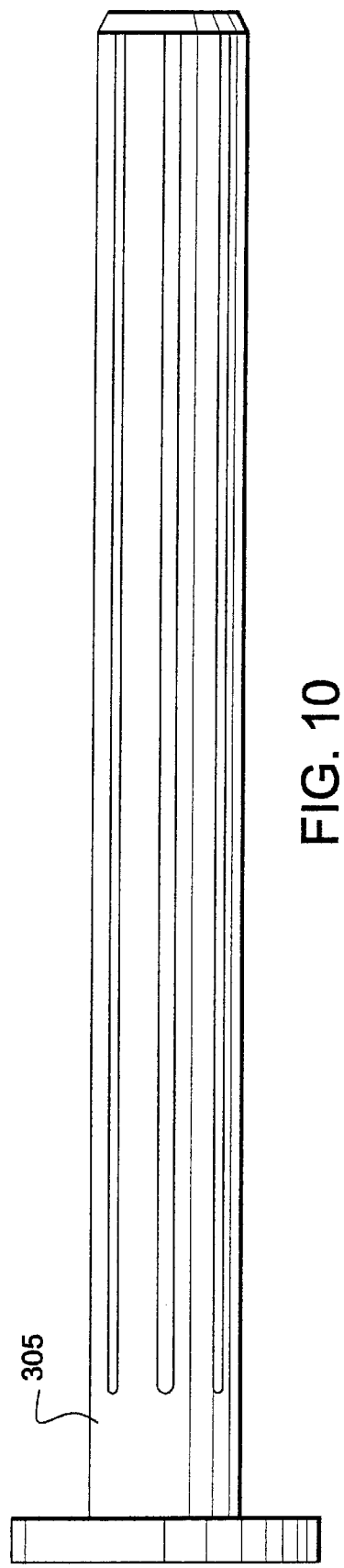
FIG. 10 is a side elevation view of a slotted melting sleeve similar to the slotted melting sleeve used in the fourth embodiment illustrated in FIG. 8, except for the fact that the slots extend continuously along the entire melting section rather than consist of a series of discrete, axially spaced slots as in FIG. 8.

FIGS. 8 and 8A show a sixth embodiment similar to the embodiment shown in FIG. 6, wherein the means for driving rotary barrel 26' comprises a motor 50 and gear train 52. As in FIG. 6, a stationary melt sleeve 305, details of which are shown in FIG. 10, is provided with an outer surface having a diameter such that it fits closely with the inner surface of the internal threads 60 on barrel 26'. The wall thickness of barrel 26' is decreased toward the discharge end of the extruder screw while maintaining a constant inner or minor diameter for the internal threads 60 of the barrel in order to provide for a progressively increasing root depth of the internal threads 60, thus progressively increasing the cross sectional area of channel available for moving melted polymer towards the discharge end. Circumferentially spaced, axially extending, radial slots 34' provide passageways through melt sleeve 305 from feed channel 23 of internal screw 24 to the annular gap between melt sleeve 305 and barrel 26'. The internal threads 60 of barrel 26' then move the melt polymer along the axial extent of the melt section of the extruder screw to the discharge end of the extruder screw.

Referring to FIG. 11, a sixth embodiment of the present invention is shown, the sixth embodiment employs a driven extruder screw 65 having several flights or threads, generally designated 40, formed of curved spiral upstream components 70 in the feed section and generally linear downstream components 70' in the melt section provided around the periphery of screw 65 for use in an extruder mechanism such as for example in FIG. 16. It should be noted that the screw 65 has a core portion including a cylindrical surface 65C in the feed section portion from which the curved spiral upstream thread components 70 extend and an outwardly flaring conical surface 65F beginning at the juncture of the curved upstream thread components 70 and the linear downstream components 70' and the linear thread components 70' consequently have continuous reduction in radial dimension from their upstream to downstream ends. In this embodiment, multiple upstream screw threads 70 start in the feed section of the extruder with a helix angle that gradually increases to an infinite value in the melt section such that the downstream thread components 70' in the melt section are substantially linear and parallel to the screw axis. In the embodiment shown in FIG. 11, eight threads are provided having eight separate channels therebetween for moving solid polymer materials along the length of the screw 65. The similar embodiments of FIGS. 14, 16 and 20 employ four threads 40 formed of components 70 and 70' oriented and shaped in essentially the same manner as the threads of the FIG. 11 embodiment. The various screws shown in FIGS. 11, 14, 16 and 20 are all mounted in convential infeed sections and melt sections barrels provided with external heaters such as shown in FIGS. 1, 7, 23, etc.

The helix angle on the threads in the infeed section of the screw 65 of the embodiments of FIGS. 11, 14, 16 and 20 provides the force necessary to keep the solid polymer material moving along the screw 65. Furthermore, as noted previously, the core diameter of the screw 65 increases along the screw toward the discharge end of the screw such that the depth of the channel provided between the screw threads decreases towards the discharge end of the screw. Rotation of the screw 65 shown in FIGS. 11, 14 and 16 in a clockwise direction as viewed from the left side of the aforementioned figures results in the movement of the solid polymer materials along the screw from the left to the right.

In the embodiment of FIG. 11, axially extending radial slots 87 (FIG. 13) are provided along the leading edge of downstream melt section thread components 70' and extend from the outer circumferential surface of the core of the screw 65 radially inwardly to a plurality of internal axially parallel bores 89 as shown in FIG. 13. The radial slots 87 extending along the leading edge of screw threads 70' are formed as slots that extend the full axial length of the melt section of the screw, as shown in FIG. 11.

The embodiment of FIG. 16 differs from that of FIG. 11 in that the FIG. 16 embodiment has slots 87 all of which terminate at a common axial bore 89 (FIG. 17). The FIG. 16 embodiment also differs from the FIG. 11 embodiment in that the slots comprise a series of shorter aligned discrete slot segments 87' provided along the leading edge of the linear downstream thread component 70' as shown in FIG. 16. Discrete slot segments 87' have a length/width ratio that is greater than 1. The circumferential spacing between the radial slots is determined by the number of threads 40 provided along the length of the screw. For instance, in FIG. 13, wherein eight axially extending threads 40 are provided along the screw, radial slots 87 would be spaced at 45' from each other. In the embodiment shown in FIG. 15, where there are four axially extending threads 40 provided along the screw, the radial slots 87 would be spaced at 90' from each other.

The provision of a plurality of internal axial bores along the screw corresponding to the number of radial slots 50, as best seen in FIGS. 13 and 15, provides a further advantage of reducing the radial distance that melted polymer must travel when being removed from the surface of each channel between the threads, and hence, reduces the generation of excessive heat in the melt caused by shear energy dissipation between the melt and the radial passageways.

In the embodiment of the present invention shown in FIGS. 20 through 22, the axial portions of the threads 170 on the screw are formed from separate inserts that are inserted into radial slots extending from the channels between the threads into a plurality of axially parallel bores 189. This embodiment provides the advantages of allowing the threads to be made from a material having a higher hardness than the hardness of the body of the screw, as well as allowing for the machining of the radial slots with an internal angle so that the slots taper from a smaller width at the screw surface to a larger width at the merger with an internal axial bore. The tapered slots further reduce the generation of shear energy as the melt passes through the slots to the internal axial bores, thus preventing the overheating of the melt.

The embodiment of FIG. 23 is similar to the embodiment of FIG. 16 embodiment in employing a screw 65' in which the spiral upstream thread components 70 in the feed sections of FIG. 23 terminate at downstream ends 71. Such termination provides an open flightless or threadless space 90 upstream of the upstream end 100 of the linear downstream threads 71' which are positioned in the melting section.

It should be noted that FIG. 23A' is a somewhat enlarged version of a portion of FIG. 23A showing the screw 65' and the surrounding barrel potion which is only partially shown for the sake of clarity. The screw 65' includes four linear downstream threads 71' which are each separated by two flat surfaces 65f which intersect along 65I. Surfaces 65f are spaced a substantial distance from the inner surface 27 of barrel 26 and do not act in any manner in the nature of a barrier flight. The screw construction illustrated in FIGS. 23A' and 23A using the flat surfaces 65f is much more economical to fabricate than is the rounded cylindrical surface employed in the other embodiments such as shown in FIGS. 17 through 19 without any substantial performance shortcomings.

The threadless space 100 is in the area where the melting section begins and results in enhanced performance due to the fact that the compacted polymer in the flightless or threadless space becomes one annular mass ensuring that each melting section channel 110 receives an equal volume of resin. It should also be noted that the screw 65' is devoid of spiral threads in the position of said screw in which the linear downstream thread portions are provided. Also, the downstream portion of screw 65' in which linear downstream threads 71' in the portion of having outer edge surfaces 72 are provided includes an axial bore 89'. It should be noted that the outer surfaces 72 of linear downstream threads 71' are closely facing inner surface 27 of barrel 26. More specifically, the clearance between outer surfaces 72 and the inner surface 27 of the barrel is typically 0.001" for every inch of screw diameter. Thus, if the barrel has a one inch diameter, the clearance would be 0.001" and in typical screw size ranges the clearance would be between 0.008" to 0.010". The foregoing thread to barrel clearance is also applicable to the embodiments of FIGS. 11, 14, 16 and 20.

Figure 23C:
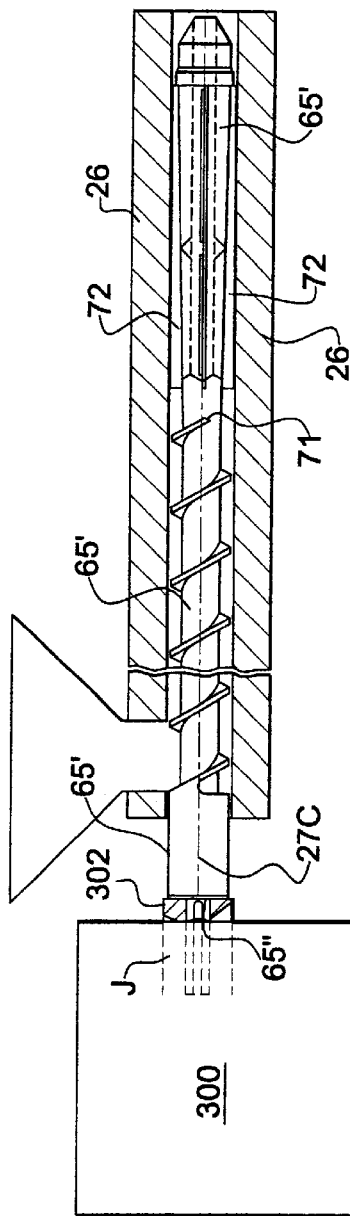
FIG. 23C is a sectional view of a version of the FIG. 23 embodiment in which the screw is held in fixed axial position during operation of the device.

FIG. 23C illustrates the drive apparatus for the embodiment of FIG. 23 in which the apparatus is used for extrusion purposes. More specifically, a motor driven gearbox 300 is fixedly supported in a conventional manner and is drivingly connected to screw 65' which is identical to screw 65' of FIG. 23, at the outer end thereof for drivingly rotating the screw about its axially extending axis 27C. During operation of the device, pressure is created inside the barrel 26 which urges the screw 65' to the left toward the motor driven gearbox 300. A positioning washer 302 is positioned on screw 65' between a radial surface of screw 65" and a journal J of the motor driven gearbox 300. The leftward force generated in the barrel 26 on screw 65' consequently causes radial surface 65" to engage a facing radial surface of journal J so as to maintain the screw in fixed position relative to the barrel and the motor driven gearbox as shown in FIG. 23C. A similar drive arrangement could also be employed with the embodiments of FIGS. 11, 14, 16 and 20.

Figure 23D:
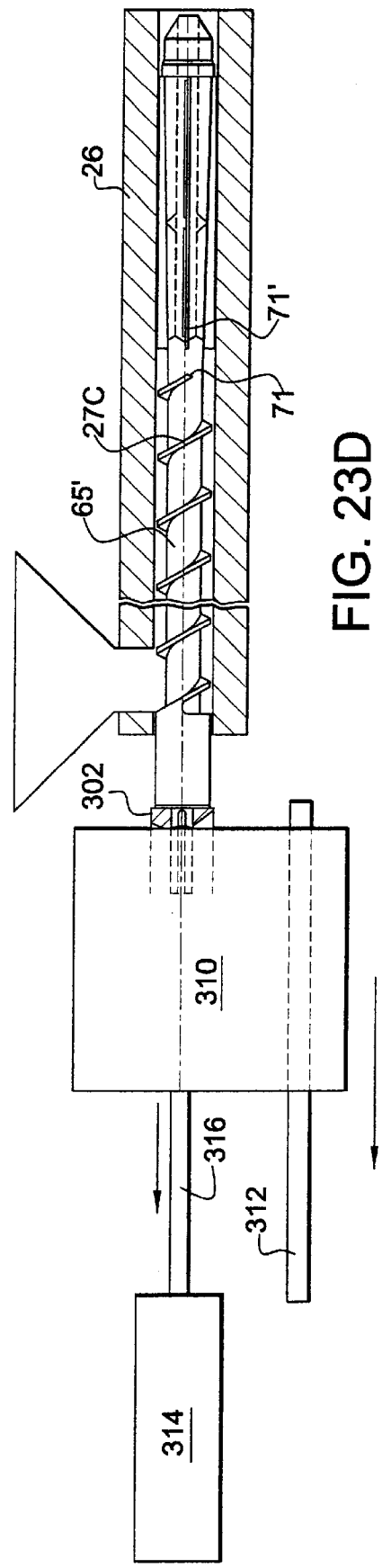
FIG. 23D is a sectional view of an alternative drive arrangement for the embodiment of FIG. 23 in which the apparatus includes an axially movable screw and hydraulic cylinder means operable to effect injection molding.

FIG. 23D illustrates an alternative arrangement in which the apparatus of FIG. 23 is used in performing an injection molding operation. More specifically, in this embodiment the axial movement of screw 65' is effected in order to perform an injection molding function. In this case, a motor driven gearbox 310 which is essentially identical to motor driven gearbox 300 with the exception of the fact that it is mounted for axial movement on fixed tie rods 312 which support the motor driven gearbox 310. A hydraulic cylinder 314 has a piston rod 316 connected to the motor driven gearbox 310 so that actuation (extension) of the hydraulic cylinder moves the motor driven gearbox 310 and screw 65' to the right to effect the ejection of the melted plastic material from the right end of the barrel 26. It should be observed that the positioning washer 302 of the embodiment of FIG. 23D is exactly identical to the same washer used in the embodiment of FIG. 23C; similarly, the screw 65' of FIG. 23D is the same as screw 65' of FIG. 23C. Thus, the only difference of the FIG. 23D embodiment is the motor driven gear box 310 being moveable as opposed to the fixedly positioned motor driven gearbox 300 of the FIG. 23C embodiment. The arrangement shown in FIG. 23D could also be used in the embodiments of FIGS. 11, 14, 16 and 20.

Modifications and variations of the above-described embodiments of the present invention are possible, as appreciated by those skilled in the art in light of the above teachings. For example, the number of threads provided around the internal screw can be varied and the channels along which the solid polymer material and the melted polymer material are moved can be maintained at a constant cross section along the length of the extrude, or can be increased or decreased in cross section along the length of the extrude. It is therefore to be understood that, within the scope of the appended claims and their equivalents, the invention may be practiced otherwise than as specifically described.

What is claimed is:

1. An extruder comprising:
   a screw having an outer surface, central axis, and upstream and downstream ends;
   a melting section having a barrel having an inner surface surrounding and enclosing said screw;
   said screw having an internal axial bore therein;
   said screw further including a plurality of circumferentially spaced external threads extending outwardly from said outer surface of said screw along a portion of said screw with said threads including linear thread portions which are substantially parallel to the central axis of said screw and which have an outer edge closely facing said inner surface of said barrel and wherein the portion of said outer surface from which the linear thread portions extend is of outwardly flaring shape so that the radial dimension of the linear thread portions decreases from an upstream portion to a downstream of the linear thread portions.

2. The extruder of claim 1, further including:
   a plurality of radial slots parallel to the central axis and each having a length/width ratio that is greater than 1, with each of said radial slots passing inwardly to said internal axial bore from an external surface of said screw from which said linear thread portions do not extend.

3. The extruder of claim 1, further including:
   a plurality of lengthwise extending radial slots provided in the screw with each of said radial slots passing inwardly to said internal axial bore from an external surface of said screw at a location adjacent one of said linear thread portions.

4. An extruder screw having an axis comprising:
   an elongated screw; said screw having an internal bore extending there through and including a central axis;
   said screw being capable of rotation about its axis while remaining stationary axially and further including a plurality of circumferentially spaced external threads extending along a portion of said screw with said external threads including spiral upstream thread portions and linear downstream thread portions positionable in a melting section of an extruder that are substantially parallel to said central axis of said screw and wherein said screw is devoid of spiral threads in said portion of said screw in which said linear thread portions are provided and wherein the space between adjacent ones of said linear thread portions comprises first and second flat surfaces which intersect along a line between such linear thread portions.

5. The extruder screw of claim 4, further including:
   a plurality of axially extending radial slots provided in said screw each having a length/width ratio that is greater than 1, with each of said radial slots extending inwardly of said screw in an area adjacent to one side of one of said linear thread portions to said internal bore and wherein said first and second flat surfaces flare outwardly downstream from their upstream portions and said internal bore is an axial bore.

6. The extruder screw of claim 4, further including:
   a plurality of lengthwise extending radial slots provided in said screw with each of said radial slots passing from an external surface of said screw adjacent one of said external threads to said internal bore and wherein said internal bore is an axial bore.

7. An extruder mechanism comprising:
   a barrel having a cylindrical inner surface, a feed section, and a melt section positioned downstream of said feed section and having a discharge end;
   a rotary screw positioned in said barrel and having a central axis and including:
   (a) curved upstream thread components disposed on the rotary screw and positioned in said feed section and
   (b) linear downstream thread components having upstream and downstream portions and disposed on the rotary screw and having a radial thickness dimension which decreases from the upstream to downstream portions of the linear thread components;
   the curved upstream thread components being positioned in said melt section for moving a solid polymer material in an axial direction along said feed section to and through said melt section to said discharge end;
   means for heating said solid polymer material in said melt section for producing a polymer melt along said cylindrical inner surface which is removed from said cylindrical surface by rotation of said linear downstream thread components for subsequent delivery to said discharge end; and
   a plurality of lengthwise extending radial ports located at circumferentially spaced positions of said rotary screw and having at least one planar surface in circumferential alignment with portions of one of said linear downstream thread components for removing polymer melt from contact with said solid polymer material to maximize the surface area of said polymer exposed to said means for heating.

8. The extruder mechanism of claim 7, wherein:
   said curved upstream thread components have a downstream end and said linear downstream thread components have an upstream end spaced downstream of and facing said downstream end of the curved upstream thread components.

9. The extruder mechanism of claim 8, wherein:

said linear downstream thread components extend lengthwise along said rotary screw parallel to said central axis and have an inner termination canted relative to said central axis.

10. An extruder mechanism comprising:

a barrel having a cylindrical inner surface, a feed section, and a melt section positioned downstream of said feed section and having a discharge end;

a rotary screw positioned in said barrel and having a central axis and including curved upstream thread components disposed on the rotary screw and positioned in said feed section, and linear downstream thread components each having a planar side and having a radial thickness dimension which decreases from the upstream to downstream portions of the linear downstream thread components;

the upstream thread components being positioned in said melt section for moving a solid polymer material in an axial direction along said feed section to and through said melt section to said discharge end;

means for heating said solid polymer material in said melt section to produce a polymer melt along said cylindrical inner surface which is removed from said cylindrical surface by rotation of said linear downstream thread components for subsequent delivery to said discharge end; and a plurality of lengthwise extending radial ports located at circumferentially spaced positions of said rotary screw and having at least one planar surface in circumferential alignment with the planar side of one of said linear downstream thread components for removing said polymer melt from contact with said solid polymer material to maximize the surface area of said polymer exposed to said means for heating.

11. An extruder mechanism comprising:

a barrel having a cylindrical inner surface, a feed section, and a melt section positioned downstream of said feed section and having a discharge end;

a rotary screw positioned in said barrel and having a central axis, curved upstream thread components having upstream and downstream ends and positioned in the feed section, and linear downstream thread components having an upstream end spaced downstream of said downstream end of the curved upstream thread components and having a continuous reduction in radial dimension from their upstream to downstream ends and being positioned in said melt section for moving a solid polymer material in an axial direction along said feed section to and through said melt section to said discharge end;

means for heating said solid polymer material in said melt section to produce a polymer melt along said cylindrical inner surface which is removed from said cylindrical surface by rotation of said linear downstream thread components for subsequent delivery to said discharge end; and a plurality of axially extending radial ports located at circumferentially spaced positions of said rotary screw in circumferential alignment with portions of said linear downstream thread components for removing said polymer melt from contact with said solid polymer material to maximize the surface area of said polymer exposed to said means for heating.

* * * * *